April 3, 1962  E. R. PRICE  3,027,879
VARIABLE RATIO FORCE TRANSMITTING MECHANISM
Filed Sept. 28, 1959  3 Sheets-Sheet 1
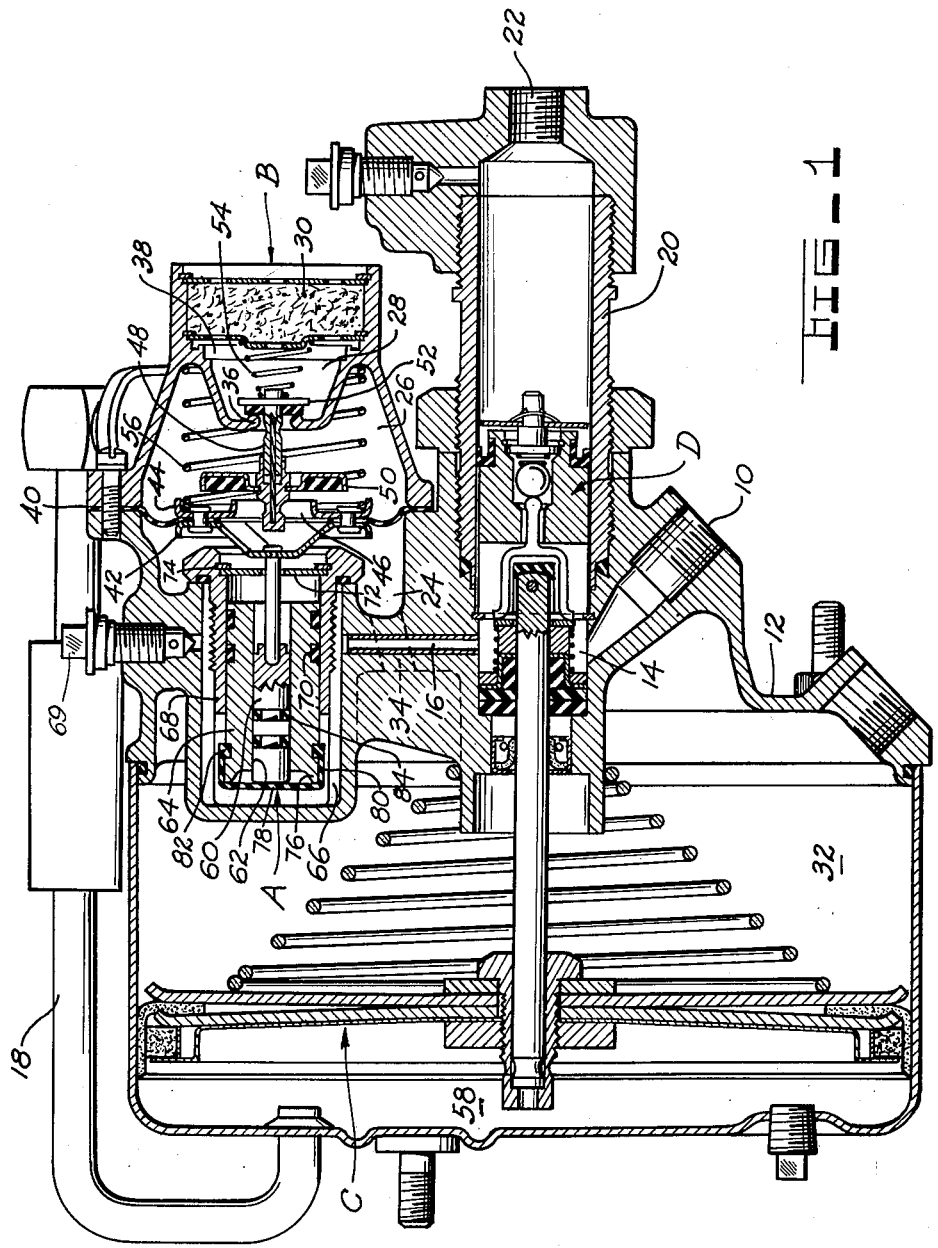
INVENTOR.
EARL R. PRICE.
BY
William P. Hickey
ATTORNEY.

April 3, 1962 E. R. PRICE 3,027,879
VARIABLE RATIO FORCE TRANSMITTING MECHANISM
Filed Sept. 28, 1959 3 Sheets-Sheet 2
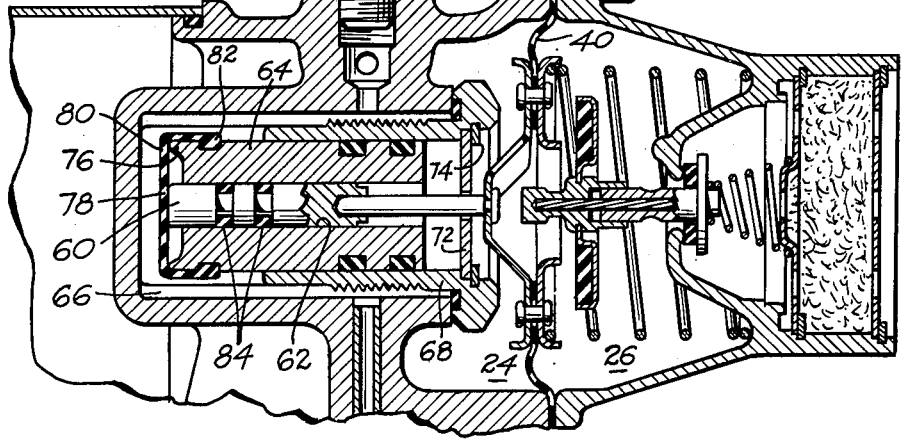
FIG_2
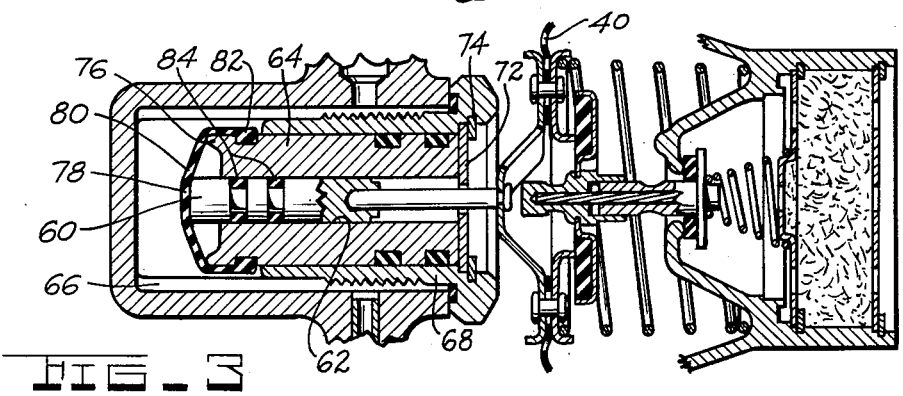
FIG_3
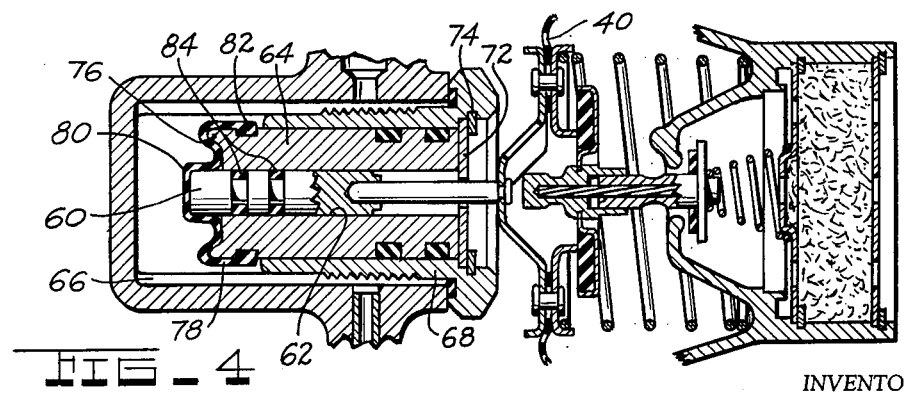
FIG_4
INVENTOR.
EARL R. PRICE.
BY
*William P. Hickey*
ATTORNEY.

April 3, 1962 E. R. PRICE 3,027,879
VARIABLE RATIO FORCE TRANSMITTING MECHANISM
Filed Sept. 28, 1959 3 Sheets-Sheet 3
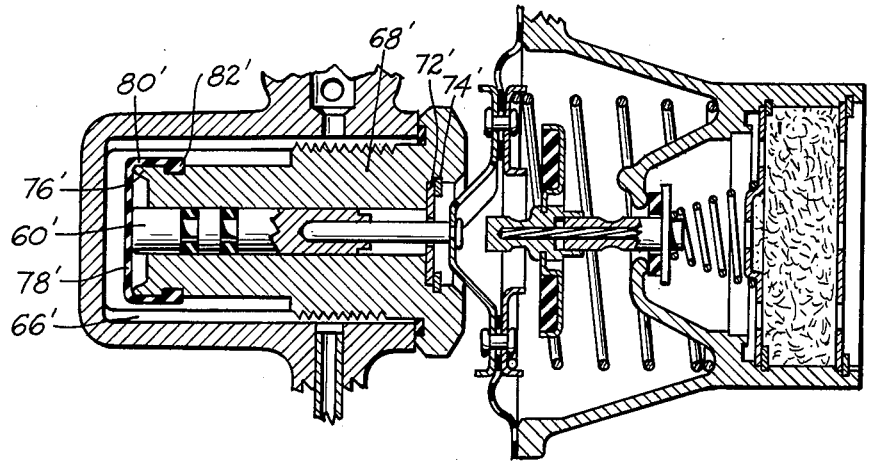
FIG_5
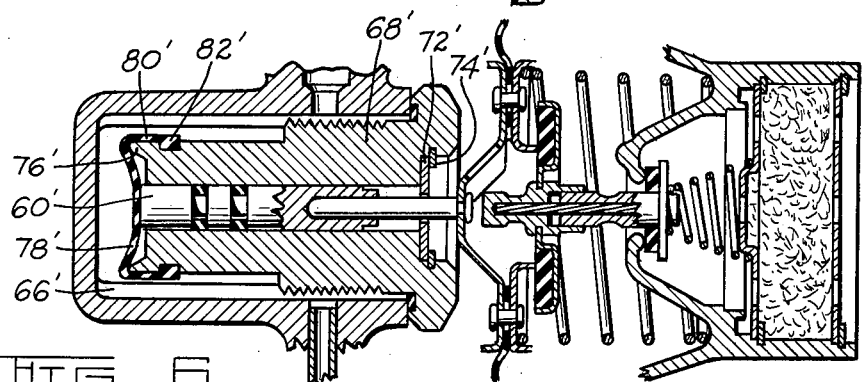
FIG_6
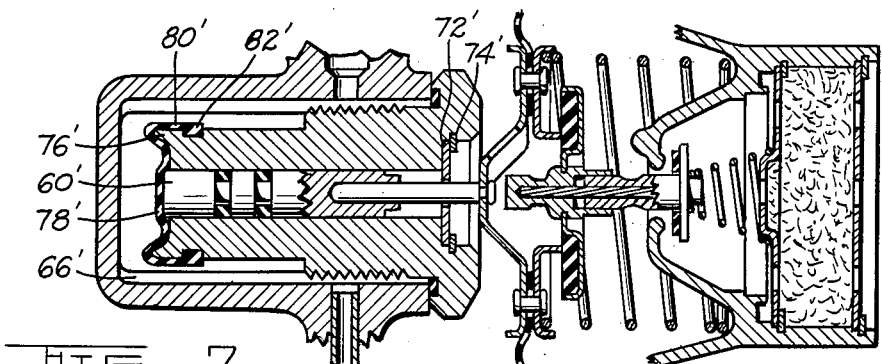
FIG_7
INVENTOR.
EARL R. PRICE.
BY
*William P. Hickey*
ATTORNEY.

United States Patent Office 3,027,879
Patented Apr. 3, 1962

3,027,879
VARIABLE RATIO FORCE TRANSMITTING
MECHANISM
Earl R. Price, South Bend, Ind., assignor to The Bendix
Corporation, a corporation of Delaware
Filed Sept. 28, 1959, Ser. No. 842,857
6 Claims. (Cl. 121—46.5)

The present invention relates generally, as indicated, to variable ratio force transmitting mechanisms; and more particularly to variable ratio actuating means for fluid pressure servomotors and/or control valves therefor, having reaction means which oppose the actuating force so that a correlation is provided between the output force of the valve or servomotor and the force required to control it.

An object of the present invention is the provision of a new and improved fluid pressure servomotor and/or control valve therefor of the above described type which can be brought into operation from its normal, or at rest position, with a minimum of actuating forces, and which after the mechanism is actuated and a reaction provided, will require a minimum of actuating force thereafter to control its operation.

A further object of the present invention is the provision of a new and improved device of the above described type in which a transition from the initial actuating stage to the final actuating stage is performed gradually.

A more general object is the provision of a new and improved actuating mechanism for devices generally which will provide a variable ratio of input to output forces during actuation of the mechanism, and which ratio preferably decreases from a high initial ratio to a low final ratio.

The invention resides in certain constructions and combinations and arrangements of parts; and further objects and advantages will become apparent to those skilled in the art from the following description of several preferred embodiments described with reference to the accompanying drawings forming a part of this specification and in which:

FIGURE 1 is a cross sectional view of a servomotor driven fluid pressure intensifying unit of the type used in automotive hydraulic braking systems;

FIGURE 2 is a fragmentary cross sectional view of the control valve shown in FIGURE 1 with the valve in its normal deenergized condition, and with somewhat exaggerated clearance between the poppet and its cooperating, open, valve seat;

FIGURE 3 is a fragmentary cross sectional view corresponding to FIGURE 2 but showing the valve in its lapped condition;

FIGURE 4 is a fragmentary cross sectional view corresponding to FIGURE 2 but showing the valve in its actuating position;

FIGURE 5 is a fragmentary cross sectional view generally similar to FIGURE 2 but showing another embodiment of the invention;

FIGURE 6 is a fragmentary cross sectional view corresponding to FIGURE 5 but showing the valve in its lapped position; and FIGURE 7 is a fragmentary cross sectional view showing the valve in its fully actuated position.

While the invention may be otherwise embodied, it is shown in the drawings as embodied in a servomotor driven hydraulic pressure intensifying unit of the type used in the hydraulic braking systems of automotive vehicles. When the servomotor units shown in FIGURE 1 of the drawings is installed in an automotive hydraulic braking system, fluid pressure from the vehicle's master cylinder is communicated to the unit's inlet port 10 in the end casting 12 of the servomotor unit, from which it flows to the follow-up chamber 14 and thence through a passageway 16 to a hydraulic actuating mechanism A which operates the servomotor's control valve B. The control valve B in turn regulates the air pressure that is delivered through the control conduit 18 to the back side of the servomotor's power piston C; and the power piston C in turn drives the fluid displacement piston D forwardly in the unit's hydraulic cylinder 20 to displace hydraulic fluid therein out through the unit's discharge port 22 to the brake applying motors of the braking system of the vehicle. For a detailed understanding of the construction and operation of the general type of device shown in FIGURE 1, reference may be had to Pfeifer Patent 2,867,090, filed April 14, 1955.

In order that the new and improved coaction between applicant's hydraulic actuating mechanism A and the servomotor control valve structure B, shown in FIGURE 1, can be had without reference to the above mentioned patent, the description of the construction and operation of the control valve B will now be given.

The control valve B generally comprises a vacuum chamber 24, a control chamber 26, and an atmospheric chamber 28 spaced apart in that order from the hydraulic actuating mechanism A. Atmospheric pressure is continually supplied to the chamber 28 through an air filter arrangement 30; and vacuum from the vehicle's propelling engine is continually communicated to the power chamber 32 on the front side of the power piston C, and thence to the vacuum chamber 24 through passageway 34 in the end casting 12 of the servomotor. The atmospheric valve chamber 28 is separated from the control chamber 26 by means of a rigid partition 36 having an atmospheric valve port 38 positioned axially with respect to the hydraulic actuating mechanism A. In order that a reaction will be provided by the valve which is generally proportional to its output signal, a wall separating the control chamber 26 and the vacuum chamber 24 is formed by means of a flexible diaphragm 40. The center portion of the diaphragm 40 is stiffened by a pair of opposing plates—the left hand plate 42 of which is in the form of a spider for providing a connection with the hydraulic actuating mechanism A, and the right hand plate 44 of which is annularly shaped to provide a vacuum port 46. Closure of the vacuum valve port 46 and atmospheric valve port 38 is had by means of a spool-shaped poppet member 48 which is provided with a pair of opposite end flanges 50 and 52 for abutment with the vacuum port plate 44, and rigid partition member 36, respectively. Poppet member 48 is normally biased to a position closing off the atmospheric valve port 38 by a coil spring 54; and a diaphragm return spring 56 is provided between the plate 44 and partition 36 to normally hold the vacuum valve port 46 open and thereby normally maintain vacuum in its control chamber 26.

Actuation of the control valve B is had by the hydraulic actuating mechanism A by moving the spider 42 towards the right to close off the vacuum valve port 46 and thereafter lift the flange 52 of the poppet member 48 from the rigid partition member 36 to admit atmospheric pressure through the atmospheric valve port 38. Build-up in pressure in the valve control chamber 26 is immediately communicated to the chamber 58 on the back side of the power piston C to thereby energize the servomotor by an intensity generally proportional to the pressure differential between the vacuum in the front power chamber 32 and the pressure in the valve control chamber 26. At the same time, the same pressure differential is being exerted across the flexible diaphragm 40 to provide a generally proportional force which is being exerted against the hydraulic actuating mechanism A.

According to principles of the present invention the hydraulic actuating mechanism A is formed by a pair of pistons so interconnected as to provide a large actuating force to the spider 42 for low input pressures to the inlet port 10, and thereafter gradually decrease the ratio of the force applied to the spider 42, to the input pressure, as the pressure in the inlet port 10 is increased. The structure shown in the drawings for accomplishing this result is formed generally by means of a generally cylindrical piston 60 that is operatively connected to the spider 42 and which is positioned in the central opening 62 of an annular generally tubularly shaped piston 64. The pistons 60 and 64 are positioned in the hydraulic chamber 66 to which the passageway 16 communicates, and the chamber 66 is closed off by means of an annular bushing 68 which is threaded into the end casting 12 and slidably receives the exterior surface of the tubular shaped piston 64. Suitable grooves are provided in the top and bottom sides of the threaded connection for the bushing 68 in end casting 12 so that chamber 66 communicates with passageway 16 and a suitable vent plug 69 in the top of the casting. Suitable O-ring seals 70 are provided in the exterior surface of the tubular piston 64 to seal off the chamber 66, and an annular washer or stop 72, best seen in FIGURE 2, held in the end of the bushing 68 by means of a snap ring 74 is provided to prevent movement of the pistons out of the chamber 66. In the embodiment shown in the drawing, the inner end of the tubularly-shaped piston 64 is provided with an annular raised surface 76 adjacent its cylindrical side edges and the hydraulic actuating mechanism is completed by means of a pre-molded neoprene diaphragm 78 that is stretched over the annular raised surface 76 so that it does not normally touch the area of the end surface of the tubular piston 64 immediately surrounding its central opening 62. The diaphragm 78 is provided with generally cup-shaped sidewalls 80, and an inwardly turned molded lip 82, that is stretched over the end of the tubular piston 64 with lip 82 being seated in an annular groove in the exterior surface of the piston—so as to retain the diaphragm upon the piston and generally seal off the chamber 66 from the end of the piston.

In the normal at rest condition of the hydraulic actuating mechanism A, best seen in FIGURE 2, the cylindrical piston 60 will project out of the end surface of the tubular piston 64 to engage the diaphragm 78. As pressure is applied to the hydraulic chamber 66, the pressure exerted upon the diaphragm 78 causes both the inner and outer pistons 60 and 64 respectively, to move down the bore of bushing 68 until the vacuum seat plate 44 engages the vacuum poppet 50. Thereafter, a further increase in actuating hydraulic pressure in the chamber 66 causes the pistons to open the atmospheric poppet 52 to build up air pressure in the control chamber 26 against the reaction diaphragm 40 and to actuate the power piston C. Thereafter air pressure against the reaction diaphragm 40 resists further movement of the center piston 60; while further increase in actuating hydraulic pressure in chamber 66 causes the diaphragm 78 to stretch over the end of the center piston 60 and the outer piston 64 to proceed down the bore in the bushing 68 until it bottoms out on the annular stop 72 (see FIGURE 3). During this stretching of the diaphragm 78 over the end of piston 60 and before the outer piston 64 bottoms out on the stop 72, hydraulic pressure that is exerted on both pistons 60 and 64 is used to actuate the valve structure B. Once the tubular piston 64 is in abutment with the stop 72, increased pressure in the chamber 66 thereafter causes the diaphragm 78 to progressively fold up against the end surface of the tubular piston 64, as seen in FIGURE 4, and thereby gradually diminish the effective area of the diaphragm 78 which exerts force upon the center piston 60.

It will be understood that the force which is applied to the diaphragm 78 is divided into two parts—one of which is transmitted to the tubular piston 64, and the other of which is transmitted to the center piston 60. The manner in which his force is split depends upon the bridged area of the diaphragm i.e., the unsupported area of the diaphragm which is out of engagement with the end surface of the tubular piston 64; and as a rough approximation, it can be assumed that the force which is applied to the center half of the bridged area is applied to the piston 60 while the force which is applied to the outer half of the bridged area is applied to the outer piston 64. As the bridged area diminishes (as the diaphragm is pressed up into engagement with the end of the tubular piston 64) the bridged area of the diaphragm gradually diminishes until the whole diaphragm is either in abutment with the end of the tubular piston 64 or the end of the center piston 60. It will readily be seen that when this occurs, only the force which is applied to the portion of the diaphragm that is positioned directly over the piston 60 will be used to actuate the control valve B, while the remainder of the force will be transmitted through the stop 72 to the housing of the control valve structure. As a safety precaution against leakage, suitable O-rings 84 are provided between the center piston 60 and the tubular piston 64.

The embodiment shown in FIGURES 5, 6 and 7 of the drawings correspond generally to that shown in FIGURES 2, 3 and 4, and differ principally in that the outer annular piston 64 is eliminated and the outer surface of the diaphragm 78 is fastened directly to the sidewalls of the hydraulic chamber 66. Those portions of the embodiment shown in FIGURES 5, 6 and 7 which are identical with those of the embodiment shown in FIGURES 2, 3 and 4 are designated by a like reference numeral and are characterized further in that a prime mark is affixed thereto. In the embodiment shown in FIGURES 5, 6 and 7 the inner end of the bushing 68' is given the configuration of the inner end of the tubular piston 64 so that the diaphragm 78' is identical with the diaphragm 78, and operates in the same manner excepting that the structure which supports the outer portion of the diaphragm is rigid and does not move. With such an arrangement, all of the pressure which is applied to the diaphragm 78 is not initially applied to the piston 60'; inasmuch as the force which is applied to the outer half of the bridged area of the diaphragm 78' is at all times transmitted to the housing of the control valve structure. Pressure build-up in the chamber 66' provides a generally fixed ratio of input to output forces up until such time as the diaphragm 78' starts to be folded up against the end surface of the bushing 68'; and this will occur at a pressure considerably lower than the pressure at which the same occurs in the embodiment shown in FIGURES 2, 3 and 4. Thereafter the embodiment shown in FIGURES 5, 6 and 7 performs generally in the same manner as that shown in the embodiment of FIGURES 2, 3 and 4, so that the final ratio of the input to output forces will generally be the same.

While the invention has been described in considerable detail, I do not wish to be limited to the particular embodiments shown and described; and it is my intention to cover hereby all novel adaptations, modifications and arrangements thereof which come within the practice of those skilled in the art to which the invention relates and which come within the scope of the following claims.

I claim:

1. In a valve actuating structure and the like: a housing member having an internal pressure chamber and an opening extending outwardly of one end wall of said chamber, a force transmitting member projecting out of said opening into said chamber, means actuated by said force transmitting member urging the end of said force transmitting member inwardly of said chamber from said end wall, and a diaphragm stretched over said end of said force transmitting member with the peripheral edges of said diaphragm being sealed relative to said housing radially outwardly and spaced apart from said force transmitting member so that said diaphragm normally bridges an annular area of said end wall of said chamber, and means for conducting fluid pressure to said internal chamber, said diaphragm and force transmitting member being constructed and arranged to cause said diaphragm to progressively abut said annular area of said end wall as said fluid pressure increases to thereby change the ratio of the force exerted against said force transmitting member by said diaphragm to the hydraulic pressure in said internal chamber.

2. In a valve actuating structure and the like: a housing member having an internal pressure chamber and an opening extending outwardly of one end wall of said chamber, said end wall having an annular raised projection surrounding and spaced radially apart from said opening and projecting into said chamber, a force transmitting member projecting out of said opening into said chamber, means actuated by said force transmitting member urging the end of said force transmitting member inwardly of said chamber from said end wall, and a diaphragm stretched over said end of said force transmitting member with the peripheral edges of said diaphragm being fastened over said annular raised projection so that said diaphragm normally bridges the annular area of said end wall of said chamber that is positioned between said projection and said end of said force transmitting member, and means for conducting fluid pressure to said internal chamber, said diaphragm and force transmitting member being constructed and arranged to cause said diaphragm to progressively abut said annular area of said end wall as said fluid pressure increases to thereby change the ratio of the force exerted against said force transmitting member by said diaphragm to the hydraulic pressure in said internal chamber.

3. In valve actuating structure and the like: a body member having a chamber therein with generally cylindrical sidewalls; an annular piston slidingly engaging said sidewalls and dividing said chamber into first and second end portions, a force transmitting member initially projecting from one end of the central opening of said annular piston toward said first end of said chamber, a diaphragm extending over said one end of said force transmitting member and sealingly secured to said annular piston at radial distances spaced apart from said force transmitting member, means for subjecting the opposite face of said diaphragm from said annular piston and force transmitting member to fluid pressure, and means for transferring force from said annular piston to said body member after limited movement of said annular piston toward said second end of said chamber, said diaphragm being initially spaced away from the surface of said annular piston which immediately surrounds said force transmitting member and increasingly engaging greater areas of said surface as fluid pressure is applied to said diaphragm.

4. In a valve actuating structure and the like: a body member having a chamber therein with generally cylindrical sidewalls; a generally tubular piston slidingly engaging said sidewalls and dividing said chamber into first and second end portions, a force transmitting member initially projecting from one end of said tubular piston toward said first end of said chamber, said one end of said tubular member having an annular raised surface spaced radially from and surrounding said central opening, a diaphragm stretched over said annular raised surface for engagement with said force transmitting member, means for subjecting the opposite face of said diaphragm from said tubular piston to fluid pressure, and means limiting movement of said tubular piston towards said second end of said chamber, whereby substantially all force exerted on said diaphragm is initially transferred to said force transmitting member until movement toward said second end of said chamber is restained by said last mentioned means after which said diaphragm folds up against the end of said tubular member to transmit a progressively smaller proportion of the force exerted on said diaphragm to said force transmitting member.

5. In valve actuating structure and the like: a body member having a chamber therein with generally cylindrical sidewalls; a generally tubular piston slidingly engaging said sidewalls and dividing said chamber into first and second end portions, a force transmitting member initially projecting from one end of said tubular piston toward said first end of said chamber, said one end of said tubular member having an annular raised surface spaced radially from and surrounding said central opening, a diaphragm made of rubber-like material stretched over said annular raised surface for engagement with said force transmitting member, means for subjecting the opposite face of said diaphragm from said tubular piston to fluid pressure, and means limiting movement of said tubular piston towards said second end of said chamber, whereby substantially all force exerted on said diaphragm is initially transferred to said force transmitting member until movement toward said second end of said chamber is restrained by said last mentioned means after which said diaphragm folds up against the end of said tubular member to transmit a progressively smaller proportion of the force exerted on said diaphragm to said force transmitting member.

6. In valve actuating structure and the like: a body member having a chamber therein with generally cylindrical sidewalls; a generally tubular piston slidingly engaging said sidewalls and dividing said chamber into first and second end portions, a force transmitting member initially projecting from one end of said tubular piston toward said first end of said chamber, said one end of said tubular member having an annular raised surface at the periphery of said end surface and groove in the outer surface of said piston spaced from said one end surface, a premolded cup shaped diaphragm having a radially inwardly extended projection at its open end and stretched over said annular raised surface with said radially inwardly extending projection seated in said groove, means for subjecting the opposite face of said diaphragm from said tubular piston to fluid pressure, and means limiting movement of said tubular piston towards said second end of said chamber, whereby substantially all force exerted on said diaphragm is initially transferred to said force transmitting member until movement toward said second end of said chamber is restrained by said last mentioned means after which said diaphragm folds up against the end of said tubular member to transmit a progressively smaller portion of the force exerted on said diaphragm to said force transmitting member.

References Cited in the file of this patent

UNITED STATES PATENTS

| | | |
|---|---|---|
| 2,574,574 | Ives | Nov. 13, 1951 |
| 2,634,742 | Price | Apr. 14, 1953 |
| 2,910,051 | Hupp | Oct. 27, 1959 |
| 2,913,877 | Stelzer | Nov. 24, 1959 |
| 2,938,348 | Price et al. | May 31, 1960 |
| 2,960,830 | Ingres | Nov. 22, 1960 |

FOREIGN PATENTS

| | | |
|---|---|---|
| 689,334 | Great Britain | Mar. 25, 1953 |

UNITED STATES PATENT OFFICE
CERTIFICATE OF CORRECTION

Patent No. 3,027,879                                 April 3, 1962

Earl R. Price

It is hereby certified that error appears in the above numbered patent requiring correction and that the said Letters Patent should read as corrected below.

Column 6, line 54, for "portion" read -- proportion --.

Signed and sealed this 2nd day of October 1962.

(SEAL)
Attest:

ERNEST W. SWIDER
Attesting Officer

DAVID L. LADD
Commissioner of Patents